United States Patent
Sutardja

(10) Patent No.: US 8,094,404 B1
(45) Date of Patent: *Jan. 10, 2012

(54) PROPAGATION SELF SERVO WRITE SYSTEM AND METHOD FOR STORAGE DEVICES EMPLOYING SECTOR-SERVO SCHEME

(75) Inventor: Pantas Sutardja, Los Gatos, CA (US)

(73) Assignee: Marvell International, Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/945,204

(22) Filed: Nov. 12, 2010

Related U.S. Application Data

(63) Continuation of application No. 12/268,596, filed on Nov. 11, 2008, now Pat. No. 7,835,105, which is a continuation of application No. 10/862,414, filed on Jun. 8, 2004, now Pat. No. 7,460,326.

(60) Provisional application No. 60/505,701, filed on Sep. 24, 2003.

(51) Int. Cl.
    *G11B 21/02* (2006.01)

(52) U.S. Cl. .......................... 360/75; 360/51

(58) Field of Classification Search .................. None
    See application file for complete search history.

(56) References Cited

U.S. PATENT DOCUMENTS

| | | | |
|---|---|---|---|
| 5,448,429 A | 9/1995 | Cribbs et al. | |
| 5,570,247 A | 10/1996 | Brown et al. | |
| 5,668,679 A | 9/1997 | Swearingen et al. | |
| 5,946,157 A | 8/1999 | Codilian et al. | |
| 5,949,603 A | 9/1999 | Brown et al. | |
| 6,429,989 B1 | 8/2002 | Schultz et al. | |
| 6,600,620 B1 | 7/2003 | Krounbi et al. | |
| 6,633,451 B1 | 10/2003 | Chainer et al. | |
| 6,693,760 B1 | 2/2004 | Krounbi et al. | |
| 6,735,031 B2 | 5/2004 | Chainer et al. | |
| 6,771,443 B2 * | 8/2004 | Szita et al. | 360/51 |
| 6,992,848 B1 | 1/2006 | Agarwal et al. | |

OTHER PUBLICATIONS

USPTO Election 1 Restriction mailed Jun. 13, 2007 for U.S. Appl. No. 10/862,414, filed Jun. 8, 2004.
Response to Election 1 Restriction filed Jul. 11, 2007 in response to USPTO Non-Final Office Action mailed Jun. 13, 2007 for U.S. Appl. No. 10/862,414, filed Jun. 8, 2004.
USPTO Non-Final Office Action mailed Sep. 27, 2007 for U.S. Appl. No. 10/862,414, filed Jun. 8, 2004.
Amendment and Petition for Extension of Time filed Jan. 28, 2008 in response to USPTO Non-Final Office Action mailed Sep. 27, 2007 for U.S. Appl. No. 10/862,414, filed Jun. 8, 2004.

* cited by examiner

*Primary Examiner* — Jason Olson

(57) ABSTRACT

A self-servo writing circuit including a controller. The controller is in communication with a read/write head having a read element and a write element, in which the read element is radially offset from the write element by a first predetermined distance. The controller is configured to i) cause the write element to write a first set of wedges of servo data onto a disk, and ii) after causing the write element to write the first set of wedges of servo data, cause the write element to write a second set of wedges of servo data onto the disk between the first set of wedges of servo data. The second set of wedges of servo data is radially offset from the first set of wedges of servo data based on the first predetermined distance between the read element and the write element.

18 Claims, 10 Drawing Sheets

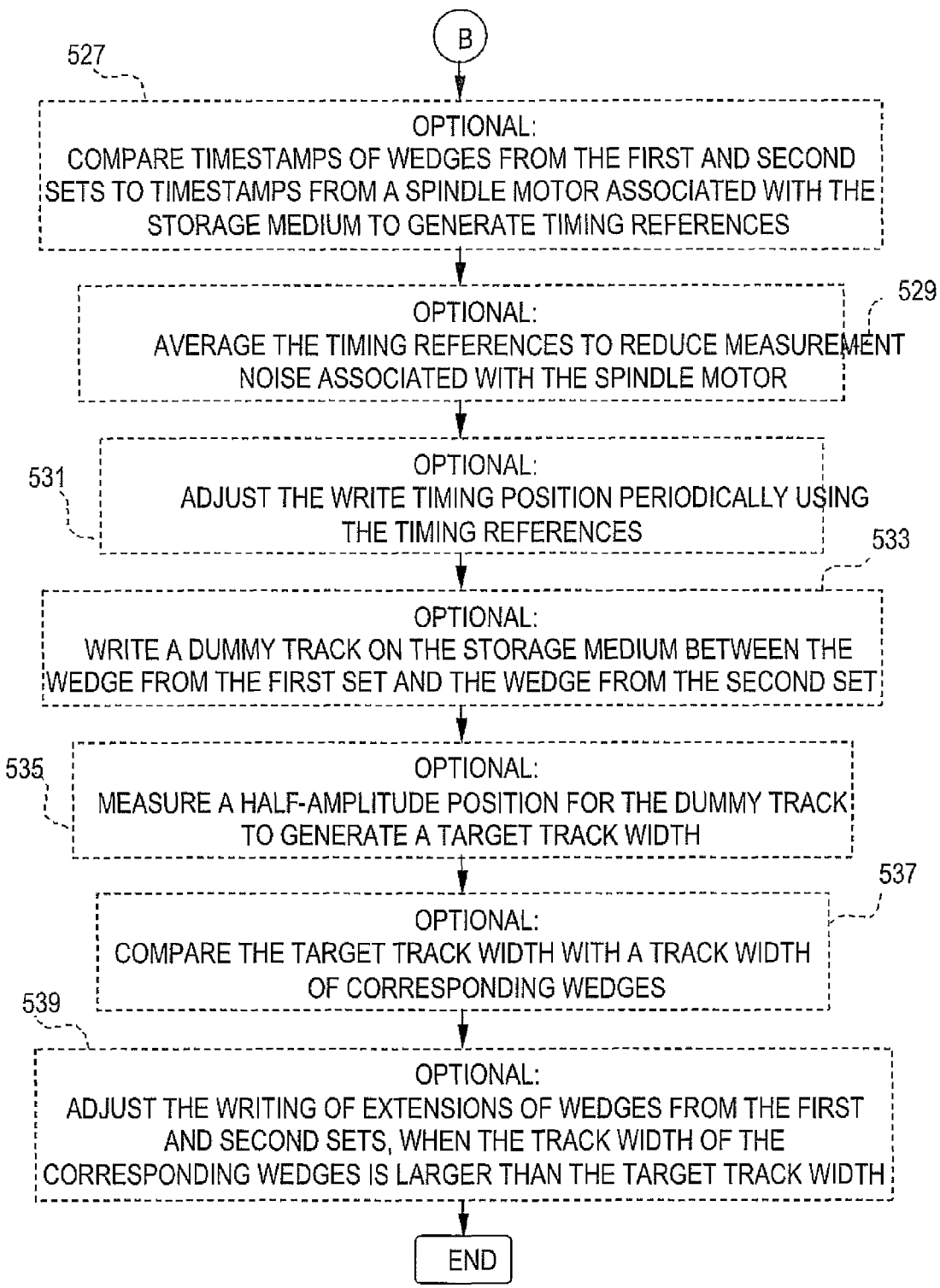

PROPAGATION SELF SERVO WRITE SYSTEM AND METHOD FOR STORAGE DEVICES EMPLOYING SECTOR-SERVO SCHEME

This application is a continuation of U.S. application Ser. No. 12/268,596, filed Nov. 11, 2008, which is a continuation of U.S. Pat. No. 7,460,326, filed Jun. 8, 2004, which claims priority under 35 U.S.C. §119(e) to U.S. Provisional Application No. 60/505,701, filed on Sep. 24, 2003. The entire content of which is hereby incorporated herein by reference.

BACKGROUND

The present invention relates to disk drives for computer systems. More particularly, the present invention relates to a self-servo writing method and system for a storage device.

Disk drives for computer systems comprise a disk for storing data and a head actuated radially over the disk for writing data to and reading data from the disk. To effectuate the radial positioning of the head over the disk, the head is connected to the distal end of an arm that is rotated about a pivot by a rotary actuator (e.g., a voice coil motor (VCM)). The disk is typically divided into a number of concentric, radially spaced tracks, where each track is divided into a number of data sectors. The disk is typically accessed a data sector at a time by positioning the head over the track that comprises the target data sector. As the disk spins, the head writes transitions (e.g., magnetic transitions) in the data sector to record data, and during read operations senses the transitions to recover the recorded data.

Accurate reproduction of the recorded data requires the head to be positioned very close to the centerline of the target data sector during both write and read operations. Thus, accessing a target data sector involves positioning or "seeking" the head to the target track, and then maintaining centerline "tracking" while data is written to or read from the disk. A closed loop servo system typically performs the seeking and tracking operations by controlling the rotary actuator in response to position information generated from the head.

A conventional technique for generating the head position control information is to record servo information in servo sectors disbursed circumferentially about the disk, "embedded" with the data sectors. FIG. 1 is an illustration of a disk showing sector servo data. A disk 100 comprises a number of concentric tracks 105 and a number of embedded servo sectors 110. Typically, each servo sector 110 is written on the surface of disk 100 as a radially-extending set of spokes or "wedges." Each servo sector 110 comprises a preamble 115, a sync mark 120, servo data 125, and servo bursts 130. The preamble 115 comprises a periodic pattern that allows proper gain adjustment and timing synchronization of the read signal, and the sync mark 120 comprises a special pattern for symbol synchronizing to the servo data 125. The servo data 125 comprises identification information, such as sector identification data and a track address. The servo control system reads the track address during seeks to derive a coarse position for the head with respect to the target track. The track addresses are recorded using a phase-coherent Gray code so that the track addresses can be accurately detected when the head is flying between tracks. The servo bursts 130 in the servo sectors 110 comprise groups of consecutive transitions (e.g., A, B, C and D bursts) that are recorded at precise intervals and offsets with respect to the track centerline. Fine head position control information is derived from the servo bursts 130 for use in centerline tracking while writing data to and reading data from the target track.

The embedded servo sectors 110 are written to the disk 100 as part of the manufacturing process. Conventionally, an external servo writer can be employed that writes the embedded servo sectors 110 to the disks by processing each head disk assembly (HDA) in an assembly line fashion. The external servo writers employ very precise head positioning mechanics, such as a laser interferometer, for positioning the head at precise radial locations with respect to previously servo-written tracks so as to achieve very high track densities.

There are certain drawbacks associated with using external servo writers to write the embedded servo sectors 110 during manufacturing. For example, the HDA is typically exposed to the environment through apertures that allow access to the disk drive's actuator arm and the insertion of a clock head that requires the servo writing procedure to take place in a clean room. Furthermore, the manufacturing throughput is limited by the number of servo writers available, and the cost of each servo writer and clean room can become very expensive to duplicate.

Attempts to overcome these drawbacks include a "self-servo writing" technique in which components internal to the disk drive are employed to perform the servo writing function. Self-servo writing does not require a clean room. because the embedded servo sectors are written by the disk drive after the HDA has been sealed. In addition, self-servo writing can be carried out autonomously within each disk drive, thereby obviating the expensive external servo writer stations.

The self-servo write (SSW) process involves several steps. A clock synchronous to the disk rotation is generated by reading some timing marks from a reference signal on the disk and adjusting a clock generator in such a way as to lock the phase of the output clock to the timing marks. The clock is used for self-servo writing and will be referred to as SSWCLK. A wedge modulo counter is set up with a modulo count that equals the expected wedge-to-wedge distance (e.g., a predetermined target distance). The wedge modulo counter runs on the SSWCLK. With the SSWCLK locked to the disk, the wedge modulo counter is also counting synchronously relative to the disk. Thus, a trigger point can be set on the wedge modulo counter to activate a servo write sequencer. When the wedge modulo counter value reaches the trigger value, the servo write sequencer writes a new wedge of servo data on the disk.

For SSW, a complete set of wedges of servo data may already exist on the disk. However, a new set of servo wedge bands may be need to be replicated in between the original servo wedges. For example, the original servo wedges may have been written with such a low resolution that they cannot be used directly for normal disk drive servo operation. A new set of higher-frequency and higher-resolution wedges would need to be created using the low-frequency version as the reference. Alternatively, the original servo wedges may be of high frequency and high resolution, but suffer from some large, repeatable run-outs. The run-outs can degrade the performance of the drive. Repair work can be performed by re-generating a new set of servo wedges free from the large run-out problems.

SUMMARY

A self-servo writing disk drive system and method of writing servo data on a storage medium are disclosed. In one aspect, this specification describes a controller for a self-servo writer. The controller includes a wedge writer configured to (i) write a first set of wedges of servo data onto a disk, and (ii) write a second set of wedges of servo data onto the disk, in which each wedge of the second set of wedges is located adjacent to a corresponding wedge of the first set of wedges. The controller further includes a wedge extender configured to write a first extension to each wedge of the first set of wedges based on a reference obtained from the corresponding wedge of the second set of wedges.

BRIEF DESCRIPTION OF THE DRAWINGS

Potential advantages of various embodiments will become apparent to those skilled in the art upon reading the following detailed description, in conjunction with the accompanying drawings, wherein like reference numerals have been used to designate like elements.

FIGS. 5A, 5B and 5C are flowcharts illustrating steps for writing servo data on a storage medium, in accordance with an exemplary embodiment of the present invention.

DETAILED DESCRIPTION

Exemplary embodiments of the present invention are directed to a self-servo writing disk drive system and method of writing servo data on a storage medium. According exemplary embodiments, a propagation self-servo write process writes a small band of wedges of servo data (referred to herein as the primary servo wedge band or the first set of wedges of servo data) on one end of a disk. Thereafter, another band of wedges of servo data (referred to herein as the secondary servo wedge band or the second set of wedges of servo data) is written in between the wedges of the primary servo wedge band. The write-to-read head offset in the radial direction is used to write the secondary servo wedge band with a radial offset relative to the primary servo wedge band. The secondary servo wedge band is then used as a timing and position reference to self-servo write at the circumferential position of the primary servo wedge band and extend the width of the primary servo wedge band. The extended primary servo wedge band is then used as a timing and position reference to extend the width of the secondary servo wedge band. The process according to exemplary embodiments can be repeated until both the primary and secondary servo wedge bands are fully extended to cover the suitable surface of the disk.

Figure 1:
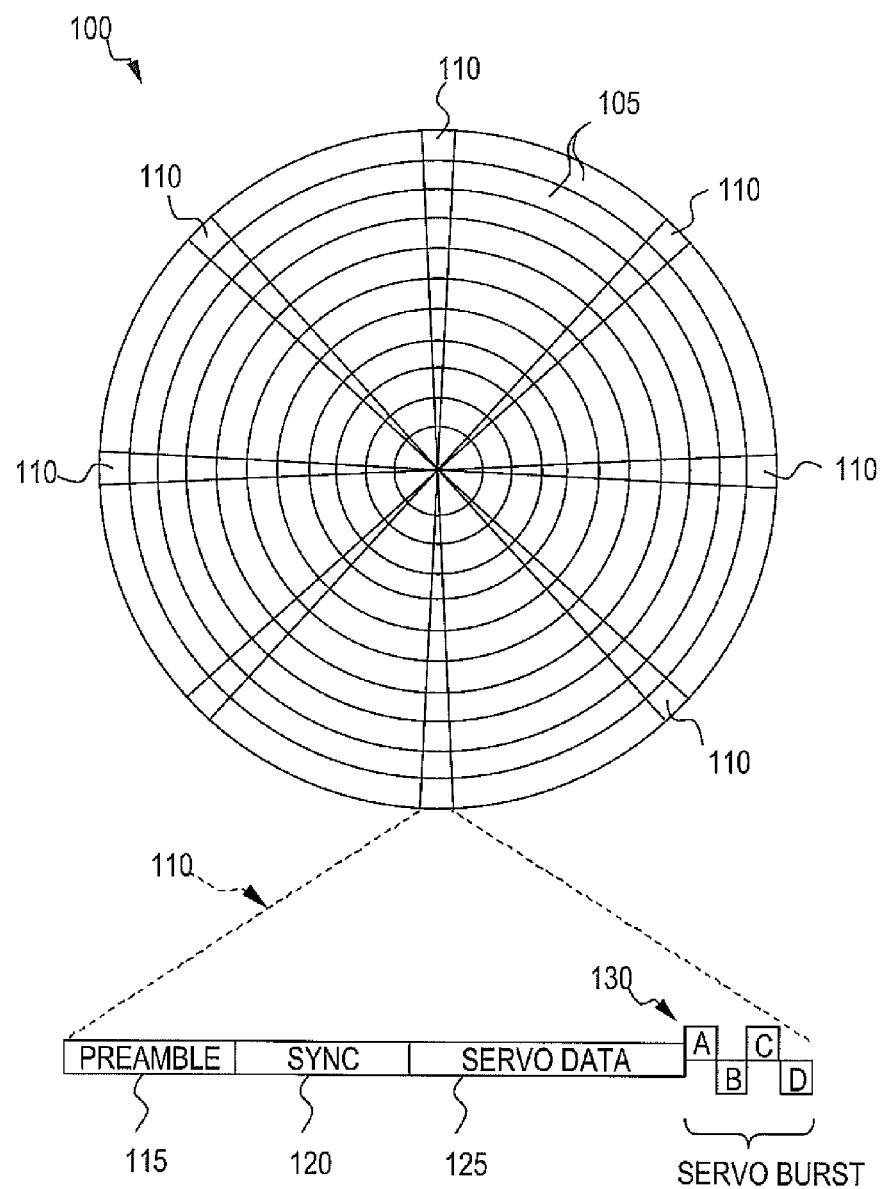
FIG. 1 is an illustration of a disk showing servo data sectors.
Figure 2:
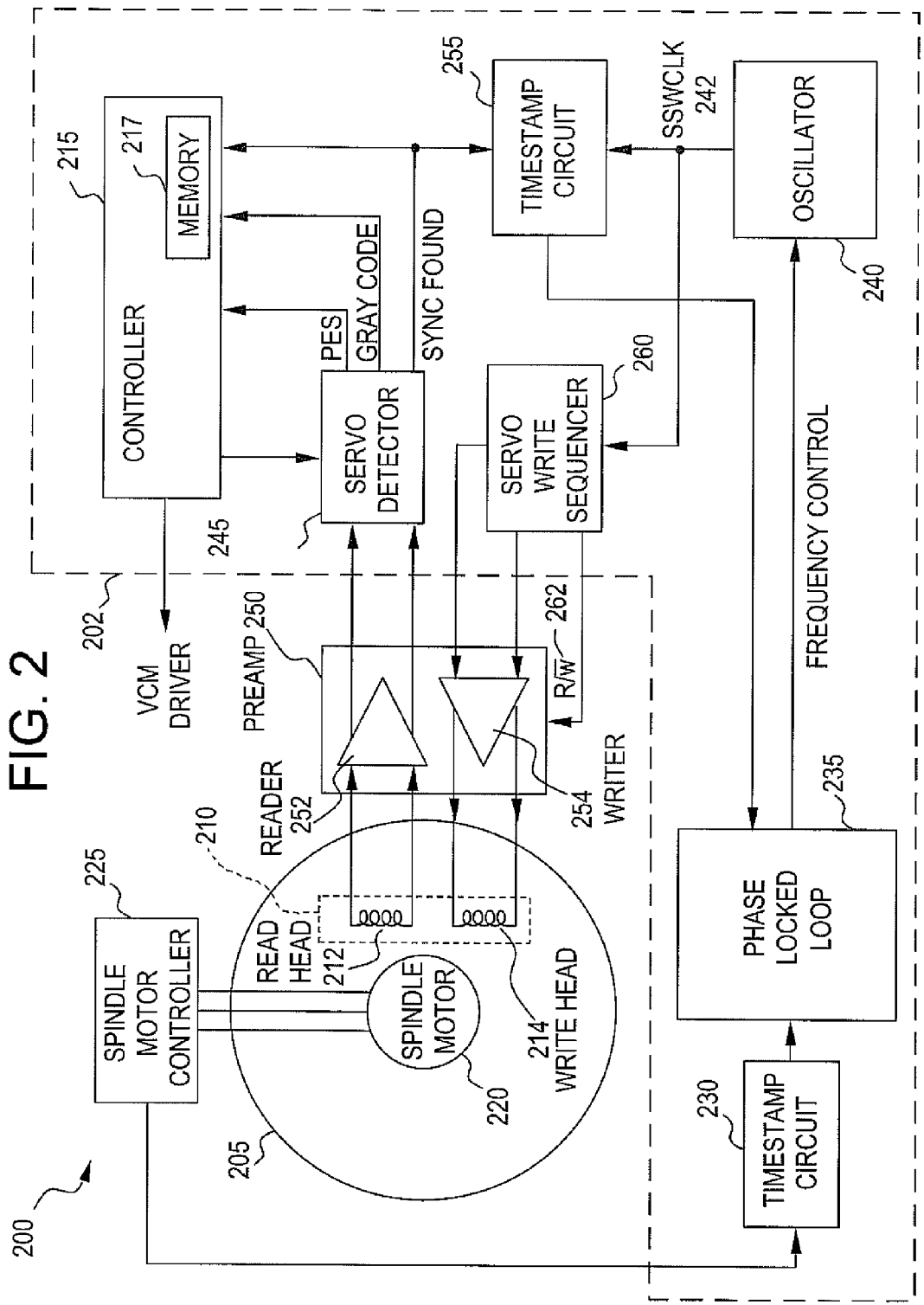
FIG. 2 is a diagram illustrating a self-servo writing disk drive system, in accordance with an exemplary embodiment of the present invention.

These and other aspects of the present invention will now be described in greater detail. FIG. 2 is a diagram illustrating a self-servo writing disk drive system 200, in accordance with an exemplary embodiment of the present invention. The disk drive system 200 includes a disk 205. The disk drive system 200 includes a head 210 comprised of a read element or head 212 and a write element or head 214. The disk drive system 200 also includes a self-servo writing circuit 202. The self-servo writing circuit 202 includes a controller 215 for providing control signals. The controller 215 is configured to cause the write element 214 to alternately write between a first set of a plurality of wedges of servo data and a second set of a plurality of wedges of servo data to the disk 205. According to exemplary embodiments, the head 205 has a uni-directional radial offset between the read element 212 and the write element 214. A band of wedges from the first set (primary wedges) can be written at one end of the disk using, for example, self-servo write or a precision servo writer. The self-servo write is then performed to write a band of wedges from the second set (the secondary wedges) in between the wedges from the first set. The controller 215 can include a memory 217 (e.g., any suitable computer memory), located internally or externally to controller 215, for storing information, such as, for example, a self-servo writing program or any other appropriate information.

The self-servo write process according to exemplary embodiments takes advantage of the radial skew in the, for example, magneto-resistive (MR)/thin film (TF) head 210 to propagate and extend a small band of seed wedges. The small band of seed wedges can be written using, for example, existing servo writers. Since only a small band is written, the manufacturing throughput on the servo-writer stations can be greatly improved, thus minimizing further investments in the servo writers. The design of head 210 includes a uni-directional skew between write element 214 and read element 212 across the inside diameter (ID) and outside diameter (OD) of the disk 205. As an example, assume self-servo write is to start from the OD of the disk 205. The head 210 is used that will write at a radial position that is smaller than the radial position of the sensing read element 212. The write skew direction can be defined as positive skew. The convention is that the lowest track identification is at the OD of the disk 205, and the highest track identification is at the ID of the disk 205. Thus, as used herein, a "positive" skew definition can convey the meaning of increased track identification. Conversely, if self-servo write is started from the ID of the disk 205, a negative skew definition can be used.

According to exemplary embodiments, the width of the written band (i.e., the initial "seed" servo wedge band) is larger than the largest write-to-read element offset. In other words, the width of the wedges from the first and second sets are greater than the radial offset between the write element 214 and the read element 212 of the head 210, plus a fixed overhead. The fixed overhead is a function of the servo wedge design, such as, for example, whether the servo is a quad burst amplitude servo or not, and the like. The additional fixed overhead can be used, because the outer-most tracks of the servo wedge band are considered incomplete, and thus cannot be used for radial positioning purposes.

The disk drive system 200 includes a spindle motor 220 for spinning the disk 205, and a spindle motor controller 225 for controlling the spindle motor 220. The self-servo writing circuit 202 also includes a first timestamp circuit 230 in communication with the spindle motor controller 225. The self-servo writing circuit 202 includes a phase-locked loop (PLL) 235 in communication with the first timestamp circuit 230. The self-servo writing circuit 202 includes an oscillator 240 in communication with the PLL 235. The oscillator 240 generates a self-servo write clock signal, herein referred to as SSWCLK 242, that is used for self-servo writing. According to exemplary embodiments, the oscillator 240 includes a high-precision frequency control capability, with an optional phase control capability.

The self-servo writing circuit 202 includes a servo detector 245 in communication with the controller 215 and the read element 212 (e.g., through reader circuitry 252 of preamplifier 250). The servo detector 245 can include a reference signal detector. The reference signal detector includes a timing mark detector that can accurately extract the timing position of a predetermined pattern in the reference signal. For example, the predetermined reference pattern can be the sync-mark in the reference signal. If the reference signal is a printed media servo wedge, circuitry suitable for low-frequency printed media detection can be used. If spirally-written reference data is used, a spiral data detector can be used, such as that disclosed in, for example, U.S. Pat. No. 5,668,679. The servo detector 245 can output, for example, a position error signal (PES), a gray code, a "sync found" signal (e.g., the sync mark of the reference signal), and/or any other suitable signal(s). The self-servo writing circuit 202 includes a second timestamp circuit 255 in communication with the oscillator 240, the controller 215 and the servo detector 245. The second timestamp circuit 255 is configured to stamp the time position of the timing mark from the reference signal (e.g., provided by the "sync found" signal from the servo detector 245) onto a timestamp counter running on SSWCLK 242. The timestamp resolution can be as high as possible to provide fractional resolution of a clock period of SSWCLK 242.

Figure 3:
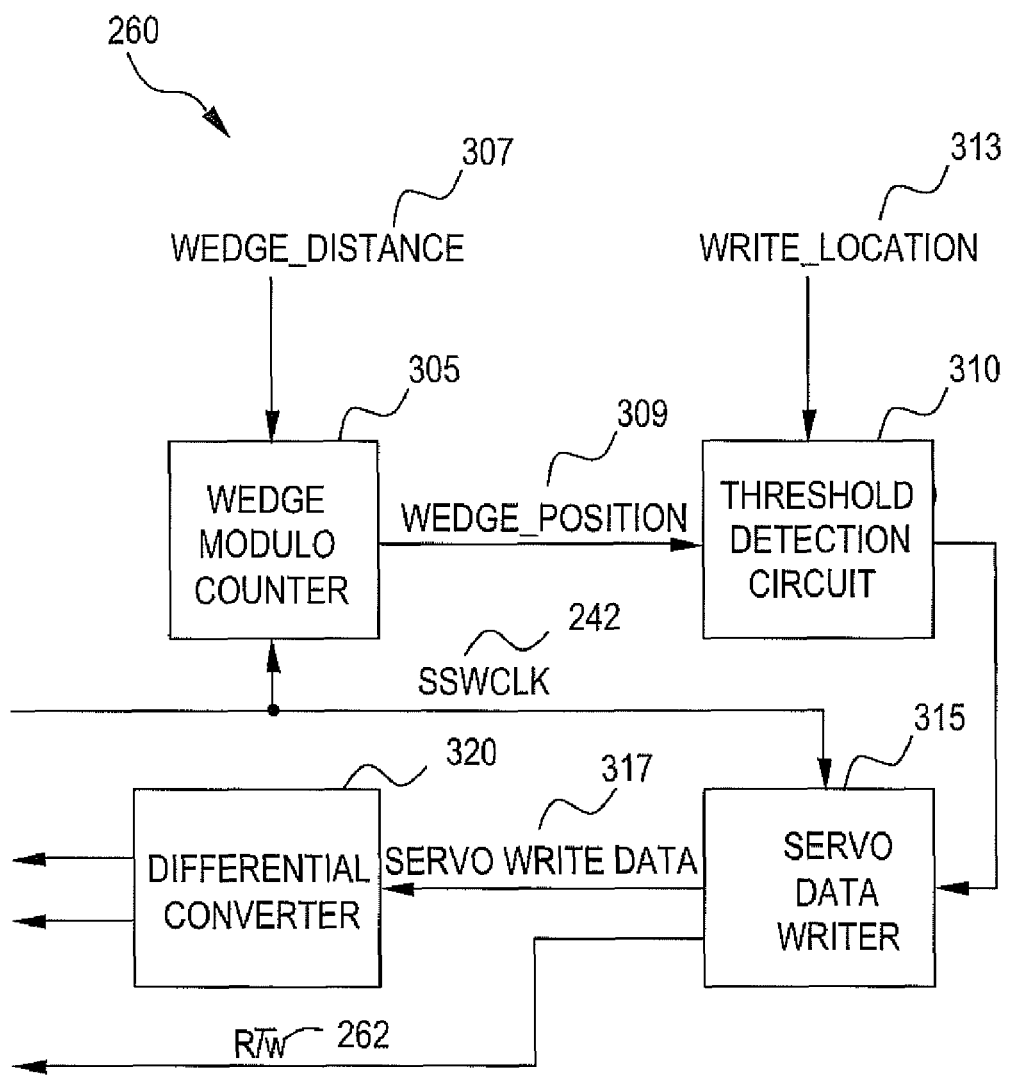
FIG. 3 is a diagram illustrating a servo write sequencer, in accordance with an exemplary embodiment of the present invention.

The self-servo writing circuit 202 includes a servo write sequencer 260 in communication with the oscillator 240 and the write element 214 (e.g., through writer circuitry 252 of preamplifier 250). The servo write sequencer 260 is configured to generate servo wedge data. The servo write sequencer 260 enables the preamplifier 250 (and the concomitant reader circuitry 252 and writer circuitry 254) through a read-write control signal 262. FIG. 3 is a diagram illustrating the servo write sequencer 260, in accordance with an exemplary embodiment of the present invention. The write sequencer 260 includes a programmable wedge modulo counter 305 that runs on the SSWCLK 242. According to exemplary embodiments, the modulo count of the wedge modulo counter 305 is set equal to any appropriate wedge-to-wedge target distance 307. The wedge modulo counter 305 supplies a wedge position signal 309 to a threshold detection circuit 310. The threshold detection circuit 310 receives a write location value 313. A servo data writer 315 is in communication with the threshold detection circuit 310 and configured to receive the SSWCLK 242. The servo data writer 315 outputs servo write data 317 and read-write control signal 262. A differential converter 320 is configured to receive the servo write data 317 and output the differential signal to the writer circuitry 254 of preamp 250.

Figure 4:
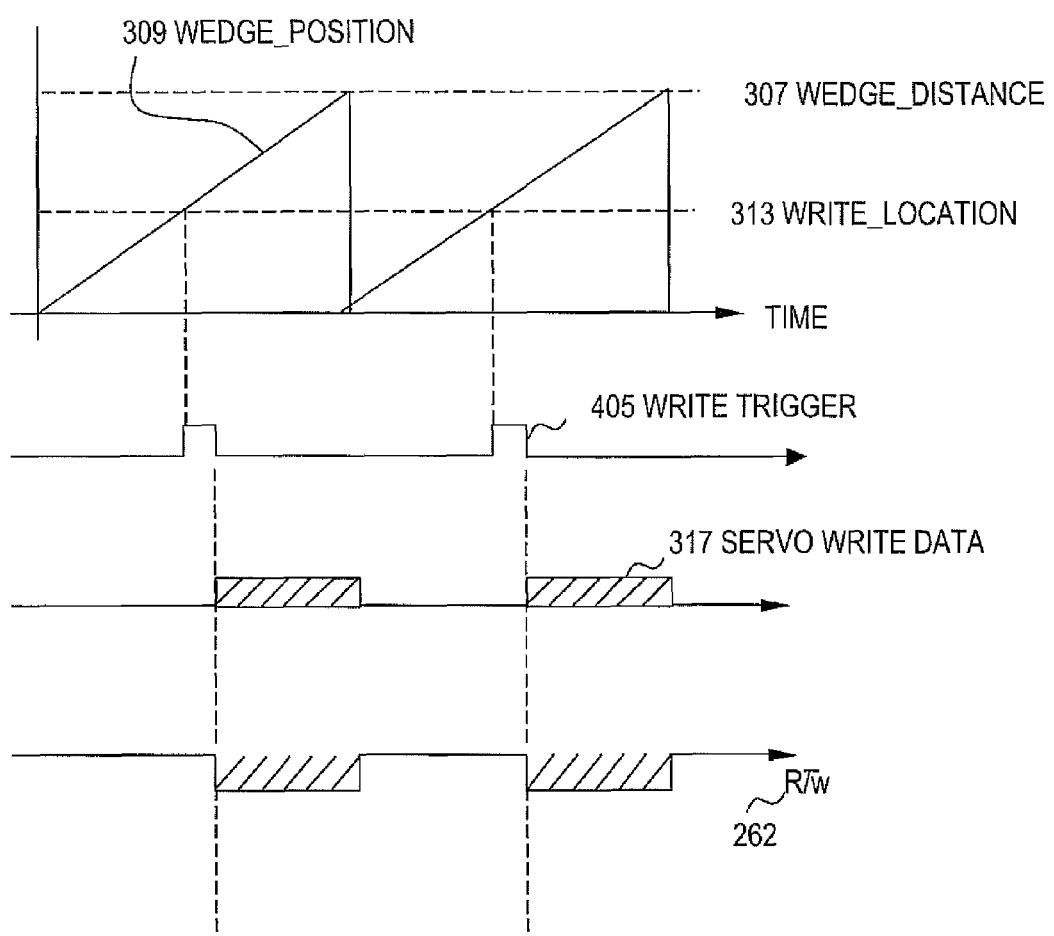
FIG. 4 is a timing diagram illustrating the timing signals for servo write sequencer, in accordance with an exemplary embodiment of the present invention.

The servo write sequencer 260 is automatically enabled when the wedge modulo counter 305 reaches a certain trigger threshold. FIG. 4 is a timing diagram illustrating the timing signals for servo write sequencer 260, in accordance with an exemplary embodiment of the present invention. The wedge position signal 309 supplied by wedge modulo counter 305 forms a sawtooth wave with a maximum of the wedge distance 307. When the wedge position signal 309 reaches a threshold of the write location value 313, a write trigger 405 is generated by the threshold detection circuit 310 and supplied to servo data writer 315. On the falling edge of the write trigger 405, the servo data writer 315 writes the servo write data 317. Additionally, read-write control signal 262 goes low at the falling edge of the write trigger 405 to enable writer circuitry 254 to write the (differential) servo write data 317 to disk 205 using write element 214.

As an example of the self-servo write function, a set of servo wedges (the "reference" servo wedges) can exist on the disk 205 and another set of servo wedges is to be generated in between the existing reference servo wedges. The new servo wedges do not need to be written at the same frequency as the existing reference servo wedges. For example, the new servo wedges can have the same wedge-to-wedge distance as that of the existing reference servo wedges. The wedge-to-wedge distance in SSWCLK 242 periods is calculated according to Equation (1):

$$\text{target\_distance} = \text{quantize}(T_{WW}/T_{SSWCLK}) \quad (1)$$

In Equation (1), $T_{WW}$ is the servo wedge pitch (i.e., the distance in time from the start of a wedge to the start of the next wedge). The quantize( ) function can be an int( ) function or a multiple of an integer (e.g., 4 for the commonly used 4T servo patterns, or any appropriate integer). The quantization is used, because the wedge modulo counter 305 can only count an integral number of SSWCLK 242 periods.

The disk drive system 200 is run and the servo detector 245 is locked to the existing reference servo wedges. The timestamps of the servo sync-marks on the reference servo wedges are read back. The timestamp information is compared against the expected timestamp position to generate phase error information using second timestamp circuit 255. The phase error information is used to drive the PLL 235, which can be comprised of firmware-based loop-filtering, and the oscillator 240. A second-order loop PLL 235 can be created by using the loop-filter computation of Equation (2):

For each timestamp for the sync-mark (timestamp[n]), do:
1. Calculate expected timestamp:

$$\text{expected\_timestamp}[n] = \text{expected\_timestamp}[n-1] + \text{target\_distance};$$

2. Calculate phase error:

$$\text{phase\_error}[n] = \text{timestamp}[n] - \text{expected\_timestamp}[n];$$

3. Generate timing update for oscillator 240:

$$\text{SSW\_freq}[n] = \text{SSW\_freq}[n-1] + b^* \text{phase\_error}[n];$$

$$\text{SSW\_delta\_phase}[n] = a^* \text{phase\_error}[n]. \quad (2)$$

In Equation (2), SSW_freq is the frequency control input to the oscillator 240, and SSW_delta_phase is a one-time phase update to the oscillator 240. The parameter "b" is the second-order gain parameter and parameter "a" is the first-order loop gain parameter. If SSW_delta_phase input is unavailable, the equation for SSW_freq of Equation (2) can be re-written as Equation (3):

$$\text{Freq}[n] = \text{Freq}[n-1] + b^* \text{phase\_error}[n];$$

$$\text{SSW\_Freq}[n] = \text{Freq}[n] + ((a^* \text{phase\_error}[n])/\text{target\_distance}). \quad (3)$$

Thus, the first-order correction input for the oscillator 240 is optional (i.e., can be folded into the frequency control input).

Once the SSWCLK 242 is locked to the disk 205, the wedge modulo counter 305 can be initialized to align the wrap-around point of the wedge modulo counter 305 to a convenient timing mark on the reference servo wedge. This timing mark can be, for example, the sync-mark of the reference servo wedge. The wedge modulo counter 305 can be initialized once when one of these timing marks is encountered. Thereafter, the wedge modulo counter 305 can be allowed to run free. Since the SSWCLK 242 is already locked to the disk 205, the wedge modulo counter 305 can count synchronously relative to the disk 205. Assuming that the wedge modulo counter 305 is an up-counter, the wedge modulo counter 305 will count up and wrap around approximately at the location of every sync-mark detection on the reference servo wedge. Consequently, a trigger threshold (e.g., using threshold detection circuit 310) can be set on the wedge modulo counter 305 for actual servo writing. The trigger threshold directly defines the relative distance of the self-servo write wedge relative to the original sync-mark of the reference servo wedge. To write the self-servo write wedge in the middle between the existing reference servo wedges, the trigger threshold is set substantially equal to half the target_distance value, as in Equation (4):

write_trigger_distance=target_distance−(SSW_wedge_width/2)−syncmark_center_offset. (4)

In Equation (4), SSW_wedge_width is the expected width of the self-servo written wedge, and syncmark_center_offset is the offset from the sync-mark of the reference servo wedge to the center of the reference servo wedge.

According to exemplary embodiments, the controller 215 is configured to cause a comparison of a radial offset position of a wedge from the second set to a wedge from the first set to measure the radial offset. To measure the read-to-write element radial offset, the head 210 can be positioned on, for example, several upper tracks of disk 205 (at a predetermined radial position) on the first set of wedges and the radial position of the second set of wedges can be read. This can be performed by enabling servo wedge detection on both the first and second sets of wedges. The read-to-write element radial offset is equal to the difference in radial position of a wedge from the first set of wedges (a primary wedge) relative to the radial position of a wedge from the second set of wedges (a secondary wedge). For example, if the location of the write element 214 is track M on the primary wedge, and it is determined that the location of the read element 212 is track M minus ΔM on the secondary wedge, then the read-to-write element offset is ΔM, which is generally not an integer number of track counts.

The controller 215 is configured to cause a measurement of timestamps of wedges from the second set relative to timestamps of wedges from the first set to generate a wedge distance, and to cause a computation of a write-to-read timing offset from a difference between the wedge distance and a predetermined wedge distance. According to exemplary embodiments, the wedge from the second set is placed as close in the middle between the wedges from the first set, as possible. However, there may be other unknown offset terms that prevent such a placement to be exact. This timing offset term are generally contributed from two sources: the write-to-read element radial offset in the circumferential direction, and write delay in the self-servo write path. The delay is measured so that the self-servo timing can be properly compensated for when propagating wedges from the first set using wedges from the second set as the reference.

The timing offset measurement can be performed by reading the timestamps for the sync-mark for the wedges from both the first and second sets (e.g., by using second timestamp circuit 255). The timestamp difference yields the distance between the wedges from the first set and the wedges from the second set. A predetermined distance relative to the wedges from the first set was initially established to write the wedges from the second set, subject to some unknown offset. The measured sync-mark timestamps provide the actual distance between the wedges. The difference between the measured distance and the predetermined distance indicates the write-to-read timing offset.

For example, the propagation self-servo write process of the present invention can use a second-order digital PLL algorithm for the timing update, as illustrated in Equation (5):

1. Measure timestamps for sync-marks on primary wedges:

$timestamp1[n]$;

2. Calculate expected timestamp1:

$expected\_timestamp1[n]=expected\_timestamp1[n-1]+target\_distance$;

2. Calculate phase error:

$phase\_error1[n]=timestamp1[n]-expected\_timestamp1[n]$;

3. Timing update for a second order PLL 235:

$SSW\_freq[n]=SSW\_freq[n-1]+b*phase\_error1[n]$;

$$SSW\_delta\_phase[n]=a*phase\_error1[n]. \quad (5)$$

In Equation (5), SSW_freq is the frequency control input to the oscillator 240, and SSW_delta_phase is a one-time phase update to the oscillator 240. The parameter "b" is the second-order gain parameter and parameter "a" is the first-order loop gain parameter. If SSW_delta_phase input is unavailable, the equation for SSW_freq of Equation (5) can be re-written as Equation (3). As part of the timing update algorithm of Equation (5), the timestamps for the wedges of the first set (the primary wedges) are measured. If the timestamp of the wedges of the second set (the secondary wedges) are also measured after a self-servo write (i.e., timestamps2[n], the difference between timestamp2 and timestamp1 can be used to calculate the timing offset adjustment that is used for writing coherently over the wedges from the first set using the wedges of the second set as the reference wedges. Thus, the actual write-to-read timing offset need not be explicitly calculated.

The average timing difference from the wedges from the first set (the primary wedges) to the wedges from the second set (the secondary wedges) is given by Equation (6):

$$diff\_21=average(timestamp2[n]-timestamp1[n]). \quad (6)$$

Consequently, the average timing difference from the wedges from the second set to the wedges from the first set is given by Equation (7):

$$diff\_12=target\_distance-diff\_21. \quad (7)$$

If diff_12 is not equal to diff_21, adjustment in the propagation self-servo write process is needed to coherently extend the wedges from the first set using the wedges from the second set is made according to Equation (8):

$$offset\_adjust = diff\_12 - diff\_21 \quad (8)$$
$$= target\_distance - 2*diff\_21.$$

Part of the adjustment can be made by adjusting the write location on the wedge modulo counter 305. However, this adjustment is done for integer counts of the offset. Any residual offset that contains fractional clock periods is made by adjusting the phase-error calculation when running the self-servo write timing update of Equation (5) using the wedges of the second set as the timing reference. For purposes of illustration and not limitation, if offset_adjust is a positive number equal to 21.43, the write position can be adjusted by quantized integer increments to account for 20 clock periods. The residual offset adjustment is then given by Equation (9):

$$\text{residual\_offset\_adjust} = \text{offset\_adjust} - \text{quantized\_offset\_adjust} \quad (9)$$
$$= 21.43 - 20$$
$$= 1.43 \text{ clock periods.}$$

When locking to the wedges of the second set, the self-servo write timing update algorithm is given by Equation (10) (with the write trigger point also adjusted by the 20 quantized clock periods given by the above example):

1. Measure timestamps for sync-marks on secondary wedges:

timestamp2[$n$];

2. Calculate expected timestamp2:

expected_timestamp2[$n$]=expected_timestamp2[$n$−1]+target_distance;

2. Calculate phase error:

phase_error2[$n$]=timestamp2[$n$]−(expected_timestamp2[$n$]+residual_offset_adjust);

3. Timing update for a second order PLL 235:

SSW_freq[$n$]=SSW_freq[$n$−1]+$b$*phase_error2[$n$];

$$\text{SSW\_delta\_phase}[n] = a*\text{phase\_error2}[n]. \quad (10)$$

In Equation (10), SSW_freq is the frequency control input to the oscillator 240, and SSW_delta_phase is a one-time phase update to the oscillator 240. The parameter "b" is the second-order gain parameter and parameter "a" is the first-order loop gain parameter. If SSW_delta_phase input is unavailable, the equation for SSW_freq of Equation (10) can be re-written as Equation (3). When Equations (5)-(10) are executed, the self-servo write data will be written coherently relative to the wedges of the first set.

After the wedges from the first set (the primary wedges) have been extended, the wedges from the second set (the secondary wedges) are extended by switching back to the wedges from the first set for the timing and position reference. However, according to an alternative exemplary embodiment, instead of making the same distance calculations and adjustments described above, the adjustment can be simply backtracked by undoing the integral portion of the write location adjustment and performing the timing lock algorithm given by Equation (11):

1. Measure timestamps for sync-marks on primary wedges:

timestamp1[$n$];

2. Calculate expected timestamp1:

expected_timestamp1[$n$]=expected_timestamp1[$n$−1]+target_distance;

2. Calculate phase error:

phase_error1[$n$]=timestamp1[$n$]−expected_timestamp1[$n$];

3. Timing update for a second order PLL 235:

SSW_freq[$n$]=SSW_freq[$n$−1]+$b$*phase_error1[$n$];

$$\text{SSW\_delta\_phase}[n] = a*\text{phase\_error1}[n]. \quad (11)$$

Equation (11) can be used if both expected_timestamp1 and expected_timestamp2 are consistently updated (i.e., no missing calculations after each wedge)

According to exemplary embodiments, the controller 215 is configured to cause the position reference and the timing reference to switch from the wedge from the first set to the wedge from the second set. The radial and timing servo positioning is switched from using the wedges from the first set to using the wedges from the second set. Taking into account the measured radial offset between the write element 214 and the read element 212, the write element 214 is positioned on the edge of the band of wedges from the first set. Consequently, the controller 215 is configured to cause the write element 214 to be positioned on the disk 205 on an edge of the first set using the radial offset between the read element 212 and the write element 214.

The controller 215 is configured to cause an adjustment of a write timing position using the write-to-read timing offset to perform a self-servo write coherently with the first set. According to exemplary embodiments, the writing timing position is adjusted using the measured write-to-read timing offset so that a newly-written wedge will be timing coherent to the previously-written wedges from the first set. Self-servo write is then enabled so that wedges from the first set are extended coherently. Thus, the controller 215 is configured to cause the write element 214 to write an extension to a wedge from the first set using at least one of a position reference and a timing reference from a corresponding wedge from the second set. The controller 215 is configured to cause a measurement of the radial offset and the write-to-read timing offset using wedges from the second set as a reference. However, this operation is optional if the timing offset measurement is performed periodically using the wedges from the first set as the reference.

The controller 215 is configured to cause the position reference and the timing reference to switch from the wedge from the second set to the wedge from the first set. Thus, the radial servo positioning is switched back to using the wedges from the first set as the reference. The controller 215 is configured to cause the write element 214 to be positioned on the disk 205 on an edge of the second set using the radial offset between the read element and the write element. Consequently, the radial position is adjusted so as to place the write element 214 at the edge of the wedges from the second set. The controller 215 is configured to cause an adjustment of the write timing position using the write-to-read timing offset to perform the self-servo write coherently with the second set. In other words, the write timing position is adjusted back to the point where the self-servo write will be performed coherently with the existing wedges from the second set. The controller 215 is configured to cause the write element 214 to write an extension to a wedge from the second set using at least one of a position reference and a timing reference from a corresponding wedge from the first set. The self-servo write process according to exemplary embodiments of the present invention can be repeated to propagate extensions to the wedges from the first and second sets to fill the desired area of the disk.

The propagation self-servo write process is an extrapolation process that can introduce a slow drift in the circumferential position of the written wedges. While the differential errors between adjacent tracks can be kept small during the propagation process, the absolute drift of the written wedge from the ideal circumferential position can be large. In a well-designed disk drive, there is an ideal wedge profile over the disk 205 that results in minimal doppler effect (frequency shift) on the read back servo signal when the head 210 performs a fast seek across the disk 205. When the wedge profile significantly deviates from this ideal profile, a large doppler effect can be created during fast head seek that can degrade the performance of the servo detector 245. Consequently, when repeating the propagation self-servo process, additional measurements can be taken and adjustments made to prevent the written track from substantially wandering from the ideal circumferential position.

More particularly, to alleviate this problem, an absolute timing reference can be introduced into the propagation self-servo write process to keep the wedge profile from deviating too far from the ideal profile. In the disk drive system 200, the spindle motor 220 can provide the absolute timing reference. An example of the absolute timing reference is the spindle motor controller 225 back-EMF output. The back-EMF pulses represent the magnetic pole positions in the assembly of the spindle motor 220. These spindle motor pulses can be timestamped using, for example, first timestamp circuit 230, and used as the absolute timing reference to measure the timestamp positions for the servo wedges. The controller 215 is configured to cause a comparison of timestamps of wedges from the first and second sets to timestamps from the spindle motor 220 to generate timing references. In other words, the sync-mark timestamps of the written wedges can be compared against the spindle-motor timing marks. For example, the timestamps from the spindle motor 220 can be the back-EMF timestamps.

Because spindle motor timing marks can be quite noisy, the measurements can be averaged or low-pass filtered to reduce the measurement error. Thus, the controller 215 is configured to cause an averaging or otherwise low-pass filtering of the generated timing references to reduce measurement noise associated with the spindle motor 220. The filtered measurements of the timing differences indicate the approximate amount of drift the propagation self-servo process has developed over time. This information can be used to adjust the write timing position to bring the servo written bands of wedges back to the ideal wedge position. Thus, the controller 215 is configured to cause an adjustment of the write timing position periodically using the timing references. However, a fraction of the drift correction can be made at any given time so as not to create an instantaneously-large write incoherence between tracks. By correcting only a fraction of the drift at any given time, the equivalent of a low-pass filtering function can be provided in the process of locking the written wedges close to the ideal wedge profile.

The corrections can be introduced into propagation self-servo write process as in Equation (12):

For each timestamp for the sync-marks (timestamp[n]), do:
1. Calculate expected timestamp:

expected_timestamp[$n$]=expected_timestamp[$n$-1]+ target_distance;

2. Calculate phase error:

phase_error[$n$]=timestamp[$n$]-expected_timestamp [$n$]+$c$*drift_error;

3. Generate timing update for oscillator 240:

SSW_freq[$n$]=SSW_freq[$n$-1]+$b$*phase_error[$n$];

SSW_delta_phase[$n$]=$a$*phase_error[$n$]. (12)

In Equation (12), drift_error is the calculated drift value, and parameter "c" is a gain number indicating how much of the calculated drift value needs to be applied. The total quantity for (c*drift_error) should be small enough so as not to introduce a substantial coherence problem between adjacent tracks. Furthermore, the correction does not need to be performed on every track. The correction should be applied periodically enough to control the drifting to an appropriate level.

According to exemplary embodiments, additional correction may need to be performed during the propagation self-servo write process on a substantially continual basis to prevent the written track widths from drifting too far over time from the ideal target track width. Even though the head 210 is advanced in the radial direction using radial positioning information from one of the sets of wedges, the propagation self-servo write process is an open-loop process and can result in drifting of the written track widths over many thousands of tracks written. To account for such drifting, occasional or otherwise periodic corrections can be made throughout the propagation self-servo process by writing an isolated dummy track of data to the disk 205. The controller 215 is configured to cause the write element 214 to write a dummy track on the disk 205 between the wedge from the first set and the wedge from the second set. Alternatively, the dummy track can be written away from the wedges from the first and second sets.

The track widths of the written servo wedges can be compared against the "ideal track width." According to exemplary embodiments, the ideal or target track width is the half-amplitude positions of the isolated dummy track. Thus, the controller 215 is configured to cause a measurement of a half-amplitude position for the dummy track to generate a track width, such as, for example, the ideal or target track width. Taking into account the angle of the write element 214 along the circumferential direction (e.g., a mechanical design consideration), an ideal track width profile across the disk 205 can be derived. According to exemplary embodiments, the ideal track width at any given radial position is measured relative to the radial coordinate positions embedded in the written servo wedge tracks. The controller 215 is configured to cause a comparison of a target (ideal) track width with the measured track width of corresponding wedges. Any deviation from the measured track width relative to the ideal track width indicates a drift in the written servo wedge track width. Accordingly, the controller 215 is configured to cause an adjustment of the writing of extensions of wedges from the first and second sets, when the track width of the corresponding wedges differs from the target track width. Thus, the deviation or difference can be used to adjust the radial positioning of the head 210 for writing of the next track. As with the timing adjustments, the measured deviation can be averaged and filtered to minimize measurement error. The adjustment can be made gradually in fractional amounts to provide a further filtering function and to prevent substantial discontinuities in the track widths of the servo wedges.

According to an alternative exemplary embodiment of the propagation self-servo write process, the first set of wedges can comprise even wedges and the second set of wedges can comprise odd wedges. For this variant of the propagation self-servo write process, the controller 215 is configured to cause the write element 214 to write a band of servo data at one end of the disk 205. The controller 215 is configured to cause a servo lock to the even wedges to establish a servo reference relative to the even wedges, and to cause the write element 214 to write a dummy wedge in an empty space on the disk between the even and odd wedges to determine a write-to-read timing offset. The controller 215 is configured to cause an adjustment of at least one of a wedge modulo counter 305, a write trigger position and a self-servo write clock phase to coherently position a self-servo write at the odd wedges. The controller 215 is configured to cause a measurement of a radial offset position between the dummy wedge and the odd wedges. The controller 215 is configured to cause an adjustment of a radial head position to place the write element outside an edge of the odd wedges. Consequently, the controller 215 is configured to cause the propagation self-servo write process to extend the odd wedges. The servo reference is switched to the odd wedges. Thus, the controller 215 is configured to cause a servo lock to the odd wedges to establish a servo reference relative to the odd wedges, and to cause the write element 214 to be positioned outside an edge of the even wedges. The controller 215 is configured to cause the propagation self-servo write process to extend the even wedges. The process can be repeated until the even and odd wedges are extended over the desired area of the surface of the disk 205.

According to exemplary embodiments, whether utilizing primary and secondary wedges or even and odd wedges, the writing of wedges alternates between the primary and secondary wedges to extend both the primary and secondary wedges, or alternates between even and odd wedges to extend both even and odd wedges. However, primary and secondary wedges do not need to be spaced equally, while even and odd wedges are spaced equally along both radial and circumferential directions. Consequently, the variant approach allows both the even and odd wedges for use by the final production servo. However, while more wedges can be written using primary and secondary wedges, there is substantially no advantage in time taken to complete the propagation self-servo process using either primary/secondary wedges or even/odd wedges. Both processes require substantially the same number of disk revolutions to complete the propagation self-servo write process of the entire surface of the disk 205.

Each element of disk drive system 200 can be any suitable type of electrical or electronic component or device that is capable of performing the functions associated with the respective element. According to exemplary embodiments, controller 215, first and second timestamp circuits 230 and 255, PLL 235, oscillator 240, servo detector 245, and servo write sequencer 260 of self-servo writing circuit 202 can be formed on monolithic substrate. According to an alternative exemplary embodiment, each component or device of self-servo writing circuit 202 can be formed on, for example, a separate substrate and can be in communication with another component or device using any appropriate type of electrical connection that is capable of carrying electrical information.

Exemplary embodiments of the present invention can be used in any disk drive system or device, including magnetic storage media, optical storage media, or any suitable storage media that is rotating and uses a self-servo write process as part of its manufacturing, such as read channel devices, disk drive systems (e.g., those employing read channel devices), other magnetic storage or recording applications, and the like.

Figure 5A:
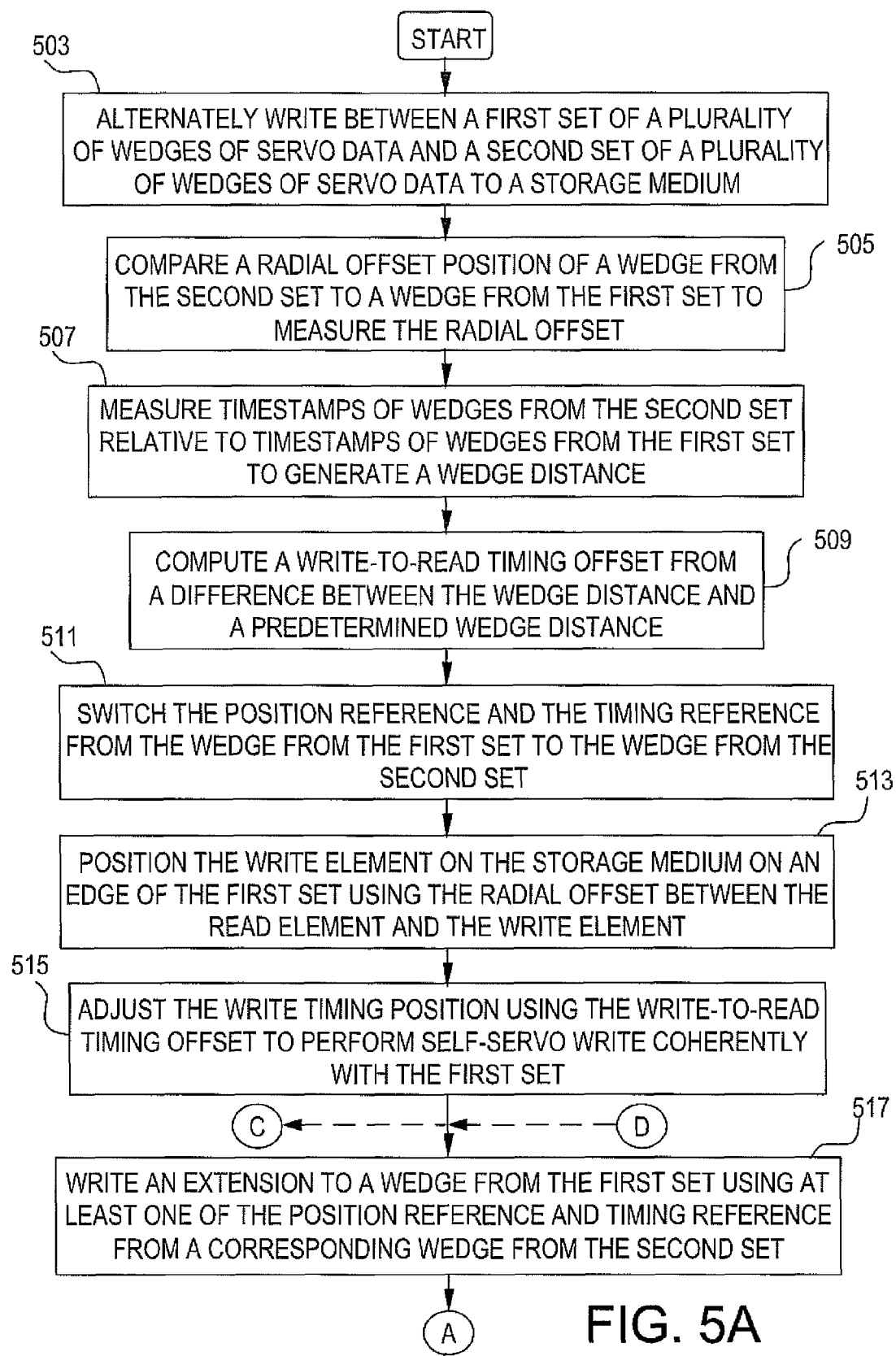
Figure 5B:
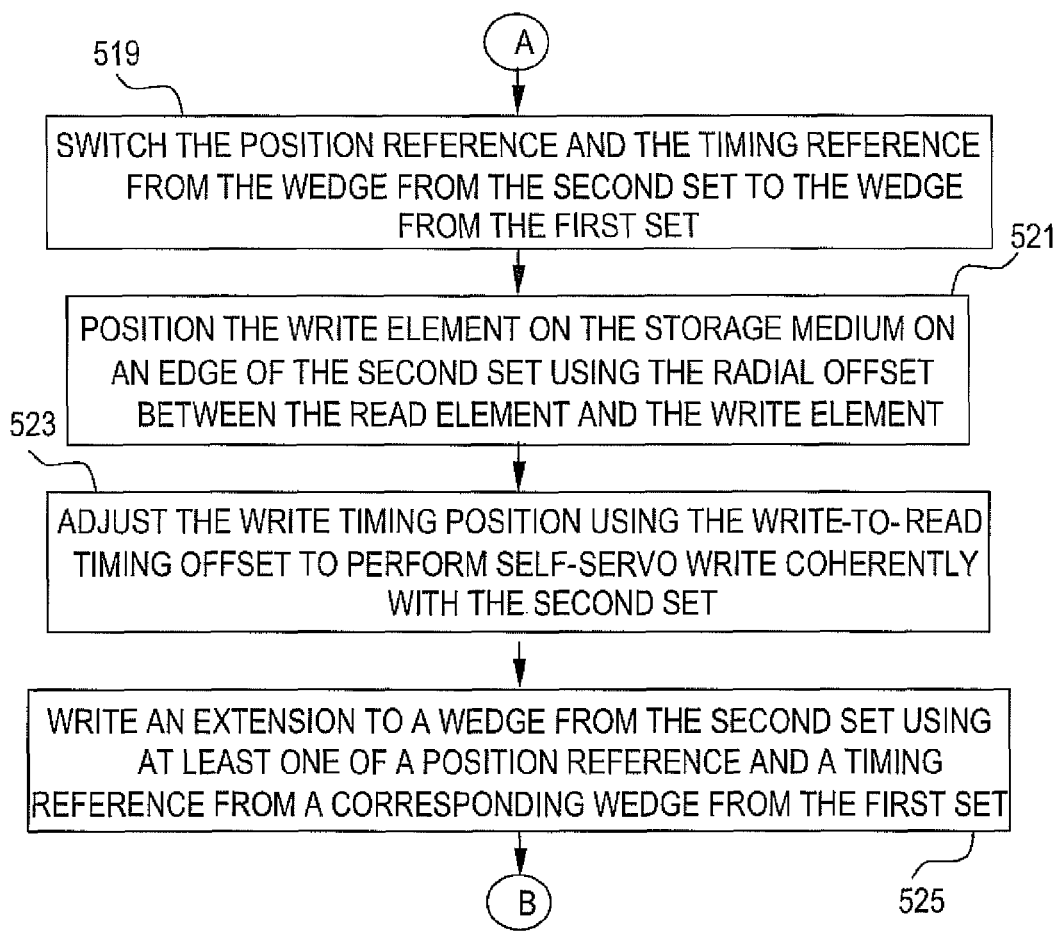

FIGS. 5A, 5B and 5C are flowcharts illustrating steps for writing servo data on a storage medium, in accordance with an exemplary embodiment of the present invention. In step 503 of FIG. 5A, a second set of a plurality of wedges of servo data are alternately written to the storage medium between a first set of a plurality of wedges of servo data. The wedges from the second set are written between wedges from the first set at a radial offset relative to the wedges from the first set. The radial offset comprises an offset between a write element and a read element of a write-to-read head. According to exemplary embodiments, the width of the alternately written wedges from the first and second sets are greater than the radial offset between the write element and the read element of the write-to-read head. In step 505, a radial offset position of a wedge from the second set is compared to a wedge from the first set to measure the radial offset. In step 507, timestamps of wedges from the second set are measured relative to timestamps of wedges from the first set to generate a wedge distance. In step 509, a write-to-read timing offset is computed from a difference between the wedge distance and a predetermined wedge distance.

In step 511, the position reference and the timing reference is switched from the wedge from the first set to the wedge from the second set. In step 513, the write element is positioned on the storage medium on an edge of the first set using the radial offset between the read element and the write element. In step 515, a write timing position is adjusted using the write-to-read timing offset to perform self-servo write coherently with the first set. In step 517, an extension to a wedge from the first set is written using at least one of a position reference and a timing reference from a corresponding wedge from the second set.

In step 519 of FIG. 5B, the position reference and the timing reference is switched from the wedge from the second set to the wedge from the first set. In step 521, the write element is positioned on the storage medium on an edge of the second set using the radial offset between the read element and the write element. In step 523, the write timing position is adjusted using the write-to-read timing offset to perform self-servo write coherently with the second set. In step 525, an extension to a wedge from the second set is written using at least one of a position reference and a timing reference from a corresponding wedge from the first set.

FIG. 5C illustrates steps that can be optionally performed as part of the propagation self-servo write process according to exemplary embodiments of the present invention. In step 527 of FIG. 5C, timestamps of wedges from the first and second sets can be compared to timestamps from a spindle motor associated with the storage medium to generate timing references. The timestamps from the spindle motor can comprise, for example, back-EMF timestamps. In step 529, the timing references can be averaged to reduce measurement noise associated with the spindle motor. In step 531, the write timing position can be adjusted periodically using the timing references. In step 533, a dummy track can be written on the storage medium between the wedge from the first set and the wedge from the second set. In step 535, a half-amplitude position can be measured for the dummy track to generate a target track width. In step 537, the target track width can be compared with a track width of corresponding wedges. In step 539, the writing of extensions of wedges from the first and second sets can be adjusted, when the track width of the corresponding wedges differs from the target track width. According to exemplary embodiments, the steps illustrated in FIGS. 5A-5C can be repeated to extend wedges from the first and second sets to fill a predetermined surface area of the storage medium.

Figure 6:
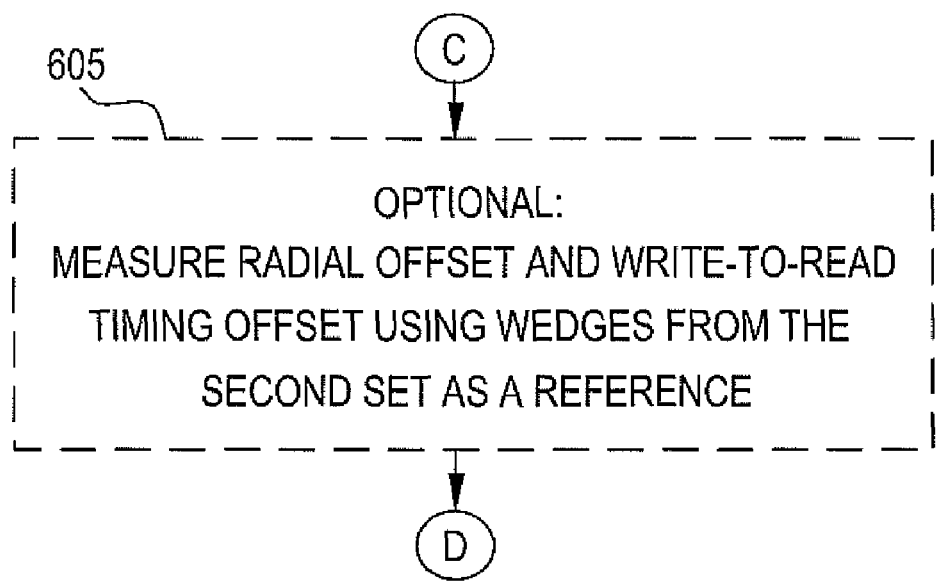
FIG. 6 is a flowchart illustrating steps for measuring radial offset and write-to-read timing offset, in accordance with an exemplary embodiment of the present invention.

FIG. 6 is a flowchart illustrating steps for measuring radial offset and write-to-read timing offset, in accordance with an exemplary embodiment of the present invention. In Step 605, the radial offset and the write-to-read timing offset can be measured using wedges from the second set as a reference. Step 605 can be performed, for example, after step 515 and before step 517 of FIG. 5A. However, step 605 is optional if the timing offset measurement is performed periodically using the wedges from the first set as the reference.

Figure 7A:
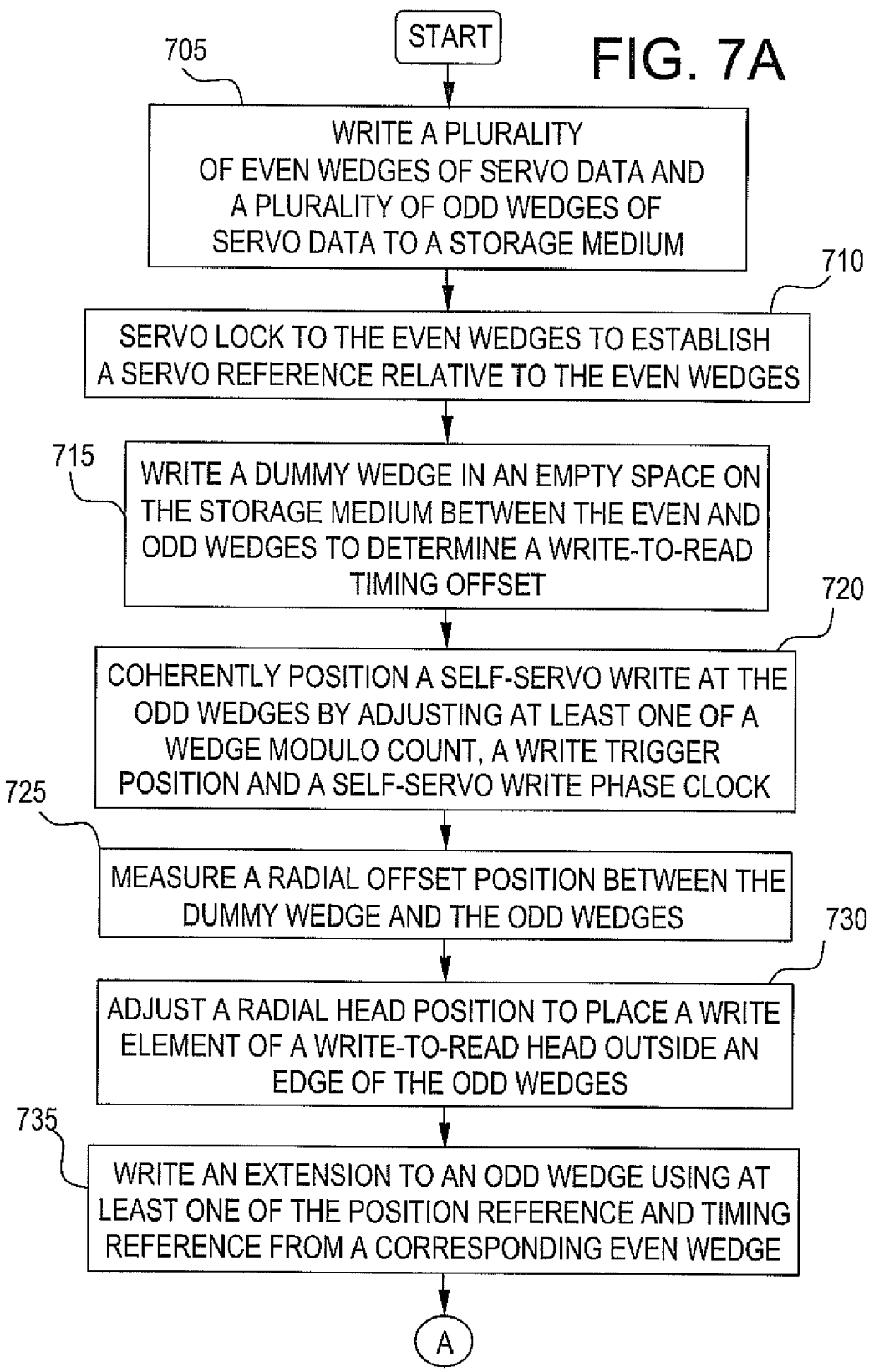
FIGS. 7A and 7B are flowcharts illustrating steps for writing servo data on a storage medium, in accordance with an alternative exemplary embodiment of the present invention.
Figure 7B:
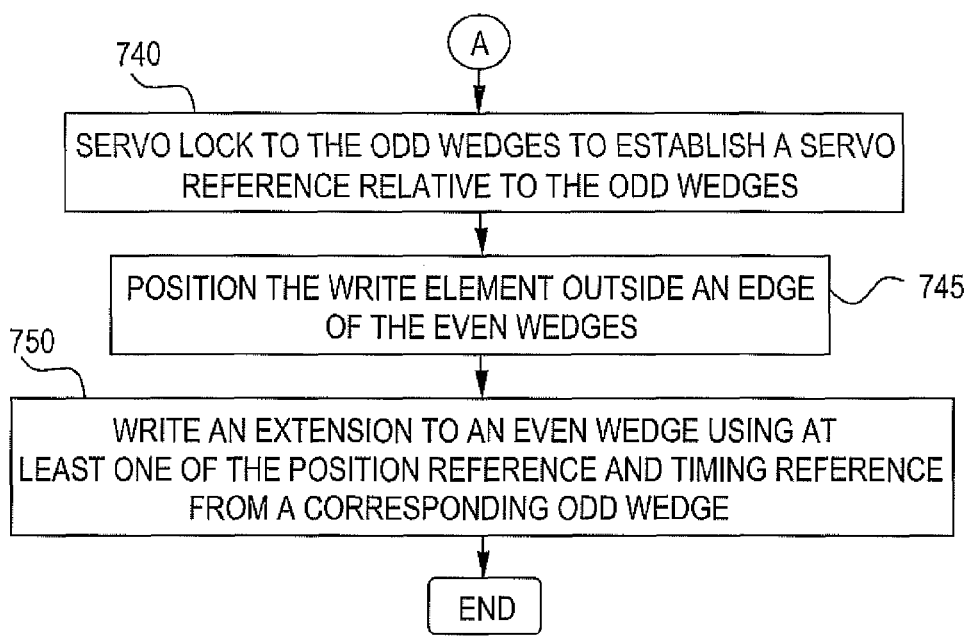

According to an alternative exemplary embodiment of the present invention, the first set of wedges can comprise even wedges and the second set of wedges can comprise odd wedges. FIGS. 7A and 7B are flowcharts illustrating steps for writing servo data on a storage medium, in accordance with an alternative exemplary embodiment of the present invention. In step 705 of FIG. 7A, a set of a plurality of odd wedges and a set of a plurality of even wedges are written on a storage medium. In step 710, a servo lock is made to the even wedges to establish a servo reference relative to the even wedges. In step 715, a dummy wedge is written in an empty space on the storage medium between the even and odd wedges to determine a write-to-read timing offset. In step 720, a self-servo write is coherently positioned at the odd wedges by adjusting at least one of a wedge modulo count, a write trigger position and a self-servo write clock phase. In step 725, a radial offset position is measured between the dummy wedge and the odd wedges. In step 730, a radial head position is adjusted to place a write element of a write-to-read head outside an edge of the odd wedges. In step 735, an extension to an odd wedge is written using at least one of the position reference and timing reference from a corresponding even wedge.

In step 740 of FIG. 7B, a servo lock is made to the odd wedges to establish a servo reference relative to the odd wedges. In step 745, the write element is positioned outside an edge of the even wedges. In step 750, an extension to an even wedge is written using at least one of the position reference and the timing reference from a corresponding odd wedge. According to exemplary embodiments, the steps illustrated in FIGS. 7A-7B can be repeated to extend even and odd wedges to fill a predetermined surface area of the storage medium.

In an alternative embodiment, the controller 215 can be implemented as a programmable processor programmed to perform all or part of the steps illustrated in FIGS. 5A-5C, 6 and 7A-7B. The program can be embodied in a "computer-readable medium" and can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A self-servo writing circuit, comprising:
a controller in communication with a read/write head having i) a read element and ii) a write element, wherein the read element is radially offset from the write element by a first predetermined distance, and wherein the controller is configured to
measure the first predetermined distance by which the read element is radially offset from the write element;
cause the write element to write a first set of wedges of servo data onto a disk; and
after causing the write element to write the first set of wedges of servo data, cause the write element to write a second set of wedges of servo data onto the disk between the first set of wedges of servo data, wherein the second set of wedges of servo data is radially offset from the first set of wedges of servo data based on the measured first predetermined distance by which the read element is radially offset from the write element.

2. The self-servo writing circuit of claim 1, wherein the controller is configured to cause the write head to extend the first set of wedges of servo data based on at least one of a timing reference and a position reference from the second set of wedges of servo data.

3. The self-servo writing circuit of claim 1, wherein the controller is configured to position the write element on an edge of the first set of wedges of servo data based on the measured first predetermined distance by which the read element is radially offset from the write element.

4. The self-servo writing circuit of claim 1, wherein the controller is configured to cause the write head to extend the second set of wedges of servo data based on at least one of a timing reference and a position reference from the first set of wedges of servo data.

5. The self-servo writing circuit of claim 1, wherein a width of each of the first set of wedges of servo data and the second set of wedges of servo data is greater than the first predetermined distance.

6. The self-servo writing circuit of claim 1, wherein the controller is configured to compare a position of the second set of wedges of servo data to a position of the first set of wedges of servo data to measure a second predetermined distance.

7. The self-servo writing circuit of claim 1, further comprising a timestamp circuit configured to i) measure timestamps of the second set of wedges of servo data relative to timestamps of the first set of wedges and ii) generate a wedge distance based on the measurement.

8. The self-servo writing circuit of claim 7, further comprising a servo write sequencer configured to generate a write-to-read timing offset based on the wedge distance and a predetermined wedge distance.

9. The self-servo writing circuit of claim 8, wherein the servo write sequencer is configured to adjust a write timing position based on the write-to-read timing offset.

10. A method of operating a self-servo writing circuit, the method comprising:
using a write element of a read/write head to write a first set of wedges of servo data onto a disk, wherein a read element is radially offset from the write element by a first predetermined distance;
measuring the first predetermined distance by which the read element is radially offset from the write element; and
after writing the first set of wedges of servo data, writing a second set of wedges of servo data onto the disk between the first set of wedges of servo data, wherein the second set of wedges of servo data is radially offset from the first set of wedges of servo data based on the measured first predetermined distance by which the read element is radially offset from the write element.

11. The method of claim 10, further comprising extending the first set of wedges of servo data based on at least one of a timing reference and a position reference from the second set of wedges of servo data.

12. The method of claim 10, further comprising positioning the write element on an edge of the first set of wedges of servo data based on the measured first predetermined distance by which the read element is radially offset from the write element.

13. The method of claim 10, further comprising extending the second set of wedges of servo data based on at least one of a timing reference and a position reference from the first set of wedges of servo data.

14. The method of claim 10, wherein a width of each of the first set of wedges of servo data and the second set of wedges of servo data is greater than the first predetermined distance.

15. The method of claim 10, further comprising comparing a position of the second set of wedges of servo data to a position of the first set of wedges of servo data to measure a second predetermined distance.

16. The method circuit of claim 10, further comprising:
   measuring timestamps of the second set of wedges of servo data relative to timestamps of the first set of wedges; and
   generating a wedge distance based on the measurement.

17. The method of claim 16, further comprising generating a write-to-read timing offset based on the wedge distance and a predetermined wedge distance.

18. The method of claim 17, further comprising adjusting a write timing position based on the write-to-read timing offset.

* * * * *